3,458,048
DIALYZER
Harvey F. Swenson, Seattle, Wash., assignor to Sweden Freezer Manufacturing Co., Seattle, Wash., a corporation of Washington
Filed Oct. 23, 1965, Ser. No. 503,002
Int. Cl. C02b 1/82; B01d 13/00
U.S. Cl. 210—321
19 Claims

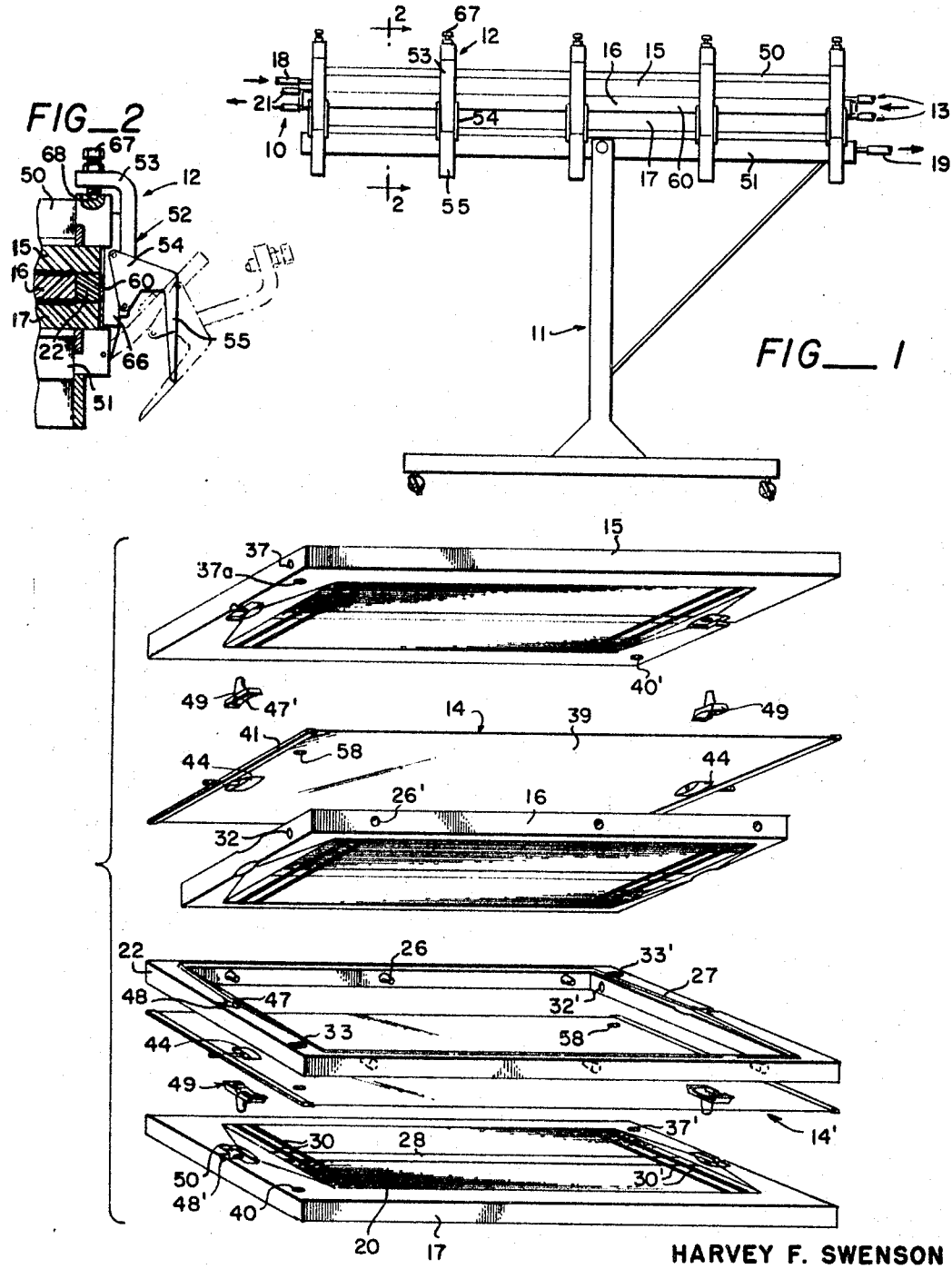

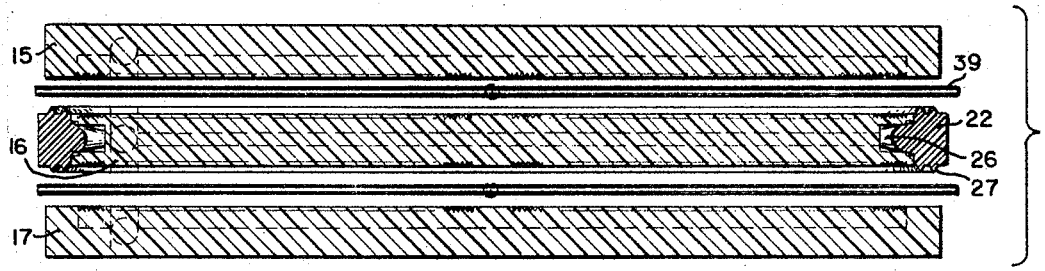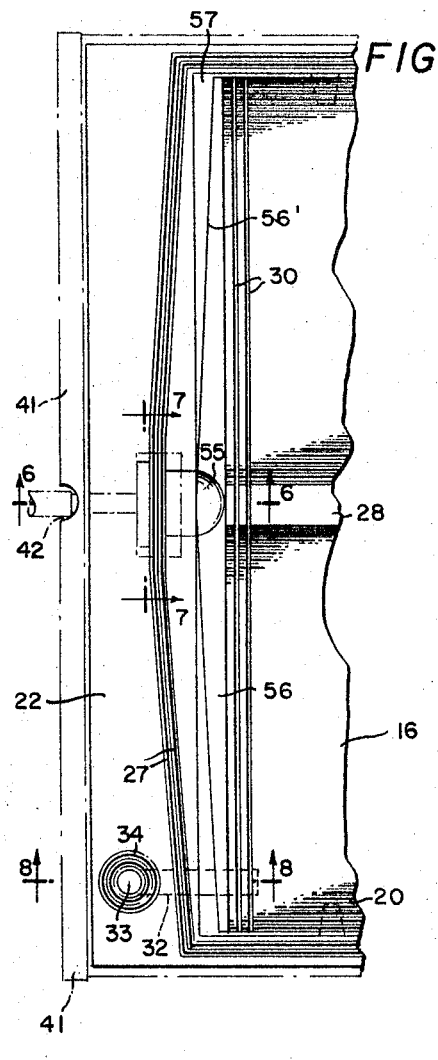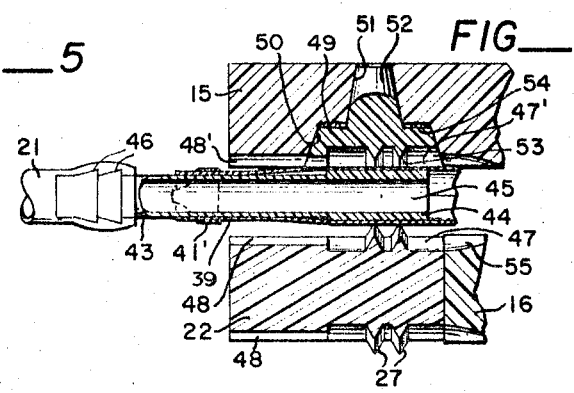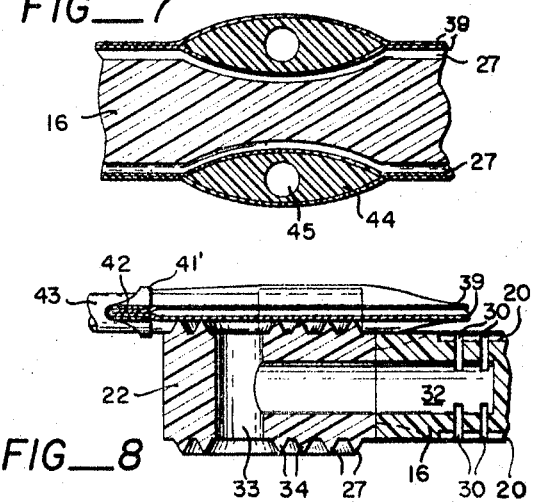
HARVEY F. SWENSON
INVENTOR.
BY Seed & Berry
ATTORNEYS United States Patent Office 3,458,048
Patented July 29, 1969

ABSTRACT OF THE DISCLOSURE

An improved three plate Kiil-type dialyzer is provided wherein the center plate is foreshortened relative to the two outer plates and enclosed by a peripheral elastomeric gasket. The gasket is adapted to engage a continuous border portion of the membrane envelope separating the three plates to form a sealed enclosure within each envelope responsive to clamping the plates together. An improved membrane kit is also provided wherein two discrete membrane sheets are clamped together at opposite ends by elongated handle strips so that the membrane sheets can be simultaneously stretched out and applied to the face of one of the dialyzer plates. Blood port fittings are provided at opposite ends of the membrane kit and retained betwen the membrane sheets by elongated tubular extensions thereof which extend through the respective handle strips.

In recent years artificial kidneys have been employed to treat patients with acute renal failure and to rehabilitate patients who would otherwise die of chronic uremia. Generally preferred in artificial kidney systems is the two-layer Kiil-type dialyzer which comprises a parallel pair of cellophane semi-permeable envelopes through which the patient's blood is gradually passed in counterflow to a dialysate solution passing on the outer surfaces of the envelopes. The border portions of the envelopes are clamped by a suitable mechanism between the border portions of the faces of a center plate and the border portions of the opposing faces of upper and lower plates. The central portions of the opposing faces of the dialyzer plates on the outside of the central portions of the cellophane envelopes are longitudinally grooved for the passage of the dialysate, and adequate clearance is provided between these grooved portions to permit the cellophane envelopes to expand sufficiently for blood flow within the envelopes. Adequate porting is provided for ingress and egress of the blood and the dialysate.

Prior to the present invention the Kiil-type dialyzers in use have employed individual sheets of cellophane as the membrane halves of the envelopes, and during assembly considerable difficulty was frequently encountered in properly positioning and stretching these sheets between the three plates and in obtaining the proper border seal to prevent leakage or contamination of the blood.

The present invention aims to provide an improved dialyzer having a superior seal between its components and employing a novel disposable preassembled membrane kit making it possible to assemble the dialyzer with less time, efffort and personnel, and to better avoid contamination of exposed working surfaces.

In the accompanying drawings:

FIG. 1 is a side elevational view illustrating the dialyzer of the present invention clamped by a suitable mechanism in operative position on a tilt cart;

FIG. 2 is a detail sectional view taken as indicated by line 2—2 of FIG. 1;

FIG. 3 is an exploded perspective view of the dialyzer components;

FIG. 4 is an exploded transverse sectional view of the dialyzer components;

FIG. 5 is a fragmentary top plan view of the center board assembly of the dialyzer and with the related membrane kit shown in phantom in operative position;

FIG. 6 is a detail longitudinal vertical sectional view taken as indicated by line 6—6 of FIG. 5, but including the upper board, and shown prior to clamping of the dialyzer boards together;

FIG. 7 is a detail transverse vertical sectional view taken along the line 7—7 of FIG. 5, but including the membrane sheets and related adapters, and shown prior to being clamped together;

FIG. 8 is a detail longitudinal vertical sectional view taken as indicated by line 8—8 of FIG. 5, but including the upper membrane kit components, and shown before clamping thereof.

Referring to FIG. 1, a hemodialyzer 10 made in accordance with the present invention is shown in operative position mounted on a tilt cart 11 with its components clamped together by a suitable clamping mechanism 12. Blood, propelled by the patient's blood pressure, flows from an arterial cannula through an arterial line which branches into a pair of inlet tubes 13 and enters the dialyzer. In the dialyzer the blood flows through a pair of cellophane membrane envelopes 14, 14 sandwiched between grooved plates or boards 15, 16 and 17 which may be formed of polypropylene. Dialysate solution is pumped to the dialyzer to enter one corner at tube 18, and passes through the dialyzer along the grooves 20 of the boards on the outside of the envelopes 14 counter to the blood flow to discharge at the diagonally opposite corner through tube 19. The purified blood leaves the dialyzer through a pair of branch tubes 21 which merge as a venous line, and then the blood, which was cooled during dialysis, is re-warmed to body temperature in a suitable heat exchanger before returning via the venous cannula to the patient. A peripheral seal is maintained between the boards and membranes by an elastomeric sealing ring or gasket 22 of neoprene or the like which circumscribes the center board 16. The top and bottom faces of this gasket 22 are each formed with a pair of continuous sealing ribs 27 which surround the grooved areas of the center board 16. Dowels 26 fitting into holes 26' initially properly position the gasket relative to the center board. The top and bottom boards 15 and 17 are identical, the upper board being upside-down and turned end for end relative to the bottom board. Each has a grooved face opposing a respective like-grooved face on the center board 16, and each of these grooved faces has a laterally spaced pair of sets of the grooves 20 extending longitudinally of the boards in parallel relation, the sets being separated by a non-grooved central band 28. The grooves 20 are cross-connected at the ends by pairs of crossgrooves 30 and 30'. These cross-grooves are deep enough to intersect longitudinal stub bores 32, 32' located at diagonally opposite corners. As shown in FIG. 8, the two stub lines 32, 32' for the center board 16 each continue outwardly into the gasket 22 and join respective through bores 33, 33' the mouths of which are each surrounded by a pair of circular sealing ribs 34. At the dialysate inlet end (left end in the drawings) an inlet passage 37 in the upper board continues inwardly to feed the manifold grooves 30 at the left end of the upper board and angles downwardly centrally of its length as a feed passage 37a to the upper end of the left bore 33 in the center board. At the bottom of the latter, a bore 40 in the lower board continues downwardly and then angles inwardly to the right to feed the left pair of grooves 30 in the lower board.

The right end of the lower board has a discharge passage 37' leading to tube 19 and egressing outwardly from the grooves 30' at the right end of the lower board. Passage 37', like passage 37 of the upper board, T's and connects with the lower end of the vertical bore 33' at the right end of the center board 16. In the same manner as the left end of the lower board, the right end of the upper board has an angle passage 40' which feeds from the crossgrooves 30' at the right end of the upper board and discharges into the upper end of the right bore 33'.

Thus, four parallel paths for the dialysate are established between the inlet tube 18 and discharge tube 19. The first path is through the upper board above the upper membrane envelope 14 via passage 37, left manifold grooves 30, longitudinal grooves 20, right manifold grooves 30', and angle passage 40', and then downwardly through passage 33' in a gasket 22 to the passage 37' in the lower board. Similarly a bottom dialysate path follows downwardly to the left angle passage 40 in the lower board via the passage 37 and gasket passage 33, and then across the lower board beneath the lower membrane envelope 14' to right manifold grooves 30' and the passage 37'. Two central dialysate paths, one beneath the upper membrane 14, and the other above the lower membrane 14', follow from upper tee passage 37 down to passage 32 in the center board 16 via gasket passage 33, across the top and bottom of the center board passage 32' therein via the respective manifold grooves 30–30' and longitudinal grooves 20. From passage 32' the two central dialysate paths are completed to discharge tube 19 by sealing ring passage 33' and tee passage 37' in the bottom board 17.

The membrane envelopes 14, 14' are preferably made in kit form for ease of application and each comprises a pair of membrane sheets 39, as of cellophane, clamped together at their ends by sheet metal channel strips 41 which are crimped in position. In order not to interfere with dialysate flow between the end passages 37, 33 and 40, and their counterparts 37', 33' and 40', the sheets 39 are formed with respective port holes 58. Each of the clamping strips 41 has a central cutout 42 and is dished outwardly, top and bottom, at 41' for passage therethrough of a tubular extension or nipple 43 on an adapter 44 which is adjustable longitudinally relative to the handle strip. The main body of the adapter is oblong in transverse cross-section, feathering down to its longitudinal side edge as shown in FIG. 7, and has a longitudinal blood-flow passage 45 therethrough continuing from the bore of the nipple 42. Teeth 46 are preferably provided on the outer end portion of the nipple 42 to aid in coupling of the blood tubes 13, 21. These teeth 46 also resist separation of the adapter from between the membrane sheets 39 before use of membrane kits. The adapters 44 and their nipples may be formed of polyethylene.

To receive respective halves of the bulges in the membrane envelopes created by the adapters 44, the sealing ring 22 has mating pockets 47, each with a semicylindrical extension 48 for half of a nipple 42. These pockets 47 are matched top and bottom by pockets 47' in elastomeric gasket fittings 49, which are in turn seated in pockets 50 formed in the upper and lower boards 15, 17. The fittings 49 and related boards 15, 17 collectively provide extensions 48' of the pockets 47' to match the extensions 48. As shown in FIG. 6, the fittings 49 have tapered side walls mating with the pockets 50, and also each have a tapered dowel 52 seated in a respective floor extension 51 of the related pocket 50. To aid in sealing, the fittings 49 have ribs 53 in their pockets 47' for squeezing the membrane sheets 39 tightly against the adapters 44, and may have outer ribs 54 bearing against the floor of the pockets 50.

The center board 16 and sealing ring 22, collectively, and each of the boards 15 and 17, provide respective tapered manifold depressions 55 ((FIG. 5) at the ends of the center band 28 to assure communication between the ports of the adapter 44 and the space between the sheets 39 of the membrane envelopes. This space is about .007" thick and is provided by way of the fact that the level of the ridges between the longitudinal grooves 20, and the center band 28, in each of the boards 15–17 is slightly depressed from the level of the surrounding border face of the respective board. This difference in level is reflected by slightly sloped faces 56 located endwise of the sets of grooves 20 and merging by lines 56' with the border level 57.

As can be seen in FIG. 6, the gasket 22 is somewhat thinner than the center board 16, and the vertical distance between the crests of the top and bottom pairs of ribs 27 is correspondingly greater than the thickness of the center board. For example, the center board 16 may be .008" thick, the gasket 22 may be .750" thick and the ribs 27 each .125" high. This arrangement permits the boards 15–17 to be so firmly clamped together that the sealing ribs 27 are deformed substantially to the top and bottom border levels 57. Also, the outside rim dimensions of the gasket 22 are preferably slightly greater than the respective rim dimensions of the upper and lower boards 15, 17 and the clamping mechanism 12 for the dialyzer is such as to apply, not only vertical squeezing pressure on the boards 15–17 but also horizontal pressure inwardly against the rim of the gasket 22 to perfect a seal between the inner face of the gasket and the rim of the center board 16.

As can be seen in FIGURES 1 and 2, the clamping mechanism includes upper and lower frames 50, 51 for engaging the top and bottom respectively, of the upper and lower boards 15, 17 and a plurality of toggle clamps 52 for urging the frames 50, 51 toward one another. Each clamp 52 includes toggle links 53, 54 with a handle 55. The link 54 is pivoted on a swing lever 66 which in turn is connected to the lower frame 51, and the link 53 has an adjusting screw 67 adapted to seat in a depression 68 in the upper frame. Retaining bars 60 interconnect various of the levers 56 to engage the rim of the gasket 22 and squeeze it inwardly.

From the foregoing description, it is seen that blood is free to flow the length of each of the membrane envelopes, 14, 14' from the adapter 44 at one end to the adapter at the other end of the unit. Border leakage from the envelopes is prevented by the pressure of the border ribs 27 of the gasket 22 acting against the opposing faces of the upper and lower boards 15, 17 and by the ribs 53 and opposite portions of the ribs 27 bearing against the top and bottom faces of the adapters 44.

To assemble the dialyzer, first the gasket 22 is stretched over the center board 16 to seat the dowels 26 in the mating holes 26', and the four fitting 49 are positioned in the pockets 50 at the ends of the boards 15, 17. Then the three boards and two membrane kits are sandwiched together with the clamping strips 41 located endwise of the board as indicated in FIG. 5. During this sandwiching a single operator can easily stretch and position the pairs of membrane sheets 39 by gripping the strips 41 at each end of the respective kit 14 and 14' with right and left hands and pulling them apart to tension the sheets before lowering the kits, first kit 14' onto the lower board 17, and then kit 14 onto the center board 16 after the latter has been lowered into position over the bottom membrane kit 14'. Then after the top board 15 is positioned over the upper membrane kit 14, and the various adapters 44 have been checked and adjusted in or out if necessary to properly seat, the board and membrane sandwich is clamped into a unit by the mechanism 12 and locked onto the tilt cart 11 ready for connection to the various blood and dialysate tubes 13, 21 and 18, 19. It is preferred to positively position the upper and lower boards 15, 17 relative to the clamping mechanism by dowels projecting from the latter into respective holes in the upper and lower faces, respectively, of such boards. Of importance to note is that when the gasket is squeezed inwardly by the retaining bar components 60 of the clamping mechanism during clamping, the gasket is not only pressed against the rim of the center board 16, but is also expanded laterally to more effectively press the ribs 27 against the contact surfaces of the outer boards 15 and 17. In this manner a perfect seal is established between all contact surfaces of the dialyzer components.

The function of the strips 41 is to aid in initial positioning and assembly of the dialyzer without danger of contaminating the inside faces of the membrane sheets 39 which will be exposed to the patient's blood during dialysis, and hence is terminated upon clamping of the dialyzer components together. As before mentioned, after dialyzer assembly the strips 41 are located beyond the ends of the boards 15–17. When dialysis is completed, the dialyzer can be readily disassembled for individual sterilizing of the boards 15–17, gasket 22, and fittings 49. This was not possible with the prior Kiil-type dialyzers in which the gasket means was not removable, and hence in which the internal surfaces could not be adequate sterilized. The membrane kits 14, 14' are normally considered completely disposable, and so fresh kits are used for the next dialysis.

Each membrane kit may be compactly stored, after assembly, in a sterilized pack by gas sterilizing it, rolling it about one of the handle strips into a compact roll, and packing it into a sterilizing sealed envelope with the membrane sheets wetted by a sterile solution to prevent cracking of the sheets during storage.

It is believed that the invention will have been clearly understood from the foregoing detailed description of my now-preferred illustrated embodiments. Changes in the details of construction may be resorted to without departing from the spirit of the invention and it is accordingly my invention that no limitations be implied and that the hereto annexed claims be given the broadest interpretation to which the employed language fairly admits.

What I claim as new is:

1. A dialysis membrane assembly comprising, a pair of opposed discrete membrane sheets, a pair of elongated handle strips secured to opposite extremities of said sheets and extending along said extremities, said handle strips being parallel and free of interconnection with one another except through said sheets whereby said sheets may be fully stretched between their said extremities when said strips are pulled away from one another, each of said handle strips having a port therethrough, and a pair of port fittings located between said sheets at opposite ends and each having a nipple projecting outwardly through a respective one of said handle strip ports for the ingress and egress of fluid between said sheets.

2. A dialysis membrane assembly according to claim 1 in which said strip are each generally U-shaped and grip the respective extremities of said sheets between their legs, the legs of each of said strips being formed with dished apart portions at the rim of the respective port with the respective port fitting nipple projecting outwardly between said dished apart portions.

3. A dialysis membrane assembly according to claim 1 in which said sheets have a pair of registering dialysate openings therethrough adjacent diagonally opposite ends of said strips.

4. A dialysis membrane assembly according to claim 1 in which said nipples are free to be adjusted longitudinally relative to said handle strips within defined limits.

5. A dialysis membrane assembly according to claim 1 in which said nipples are reduced extensions of respective port fittings located between said sheets, and said nipples have external retaining teeth means for receiving tubing thereover, said teeth means being large enough to resist separation of the nipples from the strips.

6. A dialyzer comprising, three rigid plates forming layers separated by two pairs of membranes, the center plate being of smaller width and length than the two outer plates and having an outer rim between the two outer plates; elastomeric gasket means removably surrounding the rim of the center plate and engaging a continuous border portion of each of said membrane pairs so that the membranes of each said pair are sealed between said gasket means and the adjacent one of said outer plates to form two pairs of envelopes responsive to clamping of said plates together, means for passing dialysate between said plates and membrane envelopes within the sealed enclosure of said gasket means, and means for passing fluid to be purified through said membrane envelopes.

7. A dialyzer according to claim 6 in which said gasket means presents ribs on its opposite sides directed outward toward the outer two of said plates for pressing respective of said membrane pairs against respective of said outer plates responsive to said clamping.

8. A dialyzer according to claim 7 in which the relaxed thickness of the gasket means between the outer edges of the ribs on the opposite sides of the gasket means is greater than the thickness of the center plate, and in which the relaxed thickness of the gasket means between the bases of the ribs on the opposite sides of the gasket means is less than the thickness of the center plate so that said clamping will effect a firm seating of the center plate against the two outer plates with an initial seal being created before said plates are firmly seated.

9. A dialyzer according to claim 6 in which said gasket means extends outwardly beyond the rims of the outer two of said plates so that inward pressure on said gasket means may be applied during said clamping without inhibition by the rims of the outer plates to assure a seal between said gasket means and the rim of said center plate and will also squeeze said gasket means laterally toward said outer two plates.

10. A dialyzer according to claim 6 in which each of a respective pair of port fittings are located between each of said membrane pairs, each of said port fittings having a respective nipple projecting outwardly beyond said gasket means, said membranes being pressed against said fittings responsive to said clamping.

11. A dialyzer according to claim 10 in which each of the outer two of said plates have pockets with elastomeric gasket fittings opposing said port fittings.

12. A dialyzer according to claim 11 in which said gasket means and said gasket fittings present opposed pockets receiving said port fittings.

13. A dialyzer according to claim 6 in which said gasket means comprises a continuous elastomeric ring presenting dowels fittings into the rim of said center plate.

14. A dialyzer according to claim 6 in which one of the outer two of said plates has a dialysate inlet at one end of the dialyzer and the other has a dialysate outlet on the opposite end of the dialyzer and a dialysate flow passage from said inlet through said gasket means to said outlet via said center board.

15. A dialyzer according to claim 6 in which said means for passing dialysate includes a plurality of longitudinal grooves in said plates and exposed to the outside of said envelopes, transverse manifold grooves intersecting said longitudinal grooves near the ends of the latter, and inlet and outlet passages feeding to and discharging from said manifold grooves, and passing through said gasket means into said center plate to communicate with the manifold grooves in the center plate.

16. A dialyzer comprising three rigid plates forming layers; two pairs of membranes separating said plates, each membrane pair comprising a pair of opposed discrete membrane sheets, the opposing extremities of which extend beyond the edges of said plates, a pair of elongated handle strips secured to and extending along said opposite extremities exteriorly to said plates, said handle strips being parallel and free of interconnection with one another except through said sheets, each of said handle strips having a port therethrough, and a pair of port fittings located between said sheets at opposite ends and each having a nipple projecting outwardly through a respective one of said handle strip ports for the ingress and egress of fluid between said sheets; sealing means associated with said plates to engage continuous border portions of each of said membrane pairs responsive to clamping of said plates together so that the membrane of each said pair are peripherally sealed inwardly of said handle strips to form envelopes into which said port fittings open; and means for passing dialysate between said plates and membrane envelopes within the sealed enclosures of said sealing means.

17. A dialyzer according to claim 16 wherein the center plate has a smaller width and length than the two outer plates; and wherein said sealing means comprises an elastomeric gasket means surrounding the rim of the center plate.

18. A dialyzer according to claim 17 wherein said gasket means presents ribs on its opposite sides directed outwardly toward the outer two of said plates for pressing a respective one of said membrane pairs against a respective one of said outer plates responsive to said clamping.

19. A dialyzer according to claim 18 wherein the relaxed thickness of the gasket means between the outer edges of the ribs on the opposite sides of the gasket means is greater than the thickness of the center plate and wherein the relaxed thickness of the gasket means between the bases of the ribs on the opposite sides of the gasket means is less than the thickness of the center plate so that said clamping will effect a firm seating of the center plate against the two outer plates with an initial seal being created before said plates are firmly seated.

References Cited

UNITED STATES PATENTS

| | | |
|---|---|---|
| 2,568,990 | 9/1951 | Daniel. |
| 2,686,154 | 8/1954 | MacNeill _____ 210—321 |
| 3,060,934 | 10/1962 | Claff et al. _____ 210—321 X |
| 3,074,559 | 1/1963 | Savino _____ 210—321 |
| 3,212,498 | 10/1965 | McKirdy et al. ____ 210—321 X |
| 3,212,642 | 10/1965 | Kylstra _____ 210—321 |
| 3,223,612 | 12/1965 | Chen et al. _____ 210—321 X |
| 3,252,272 | 5/1966 | Hazen et al. _____ 55—158 |
| 3,332,746 | 7/1967 | Claff et al. _____ 210—321 X |

OTHER REFERENCES

Cole et al., "Pumpless Low Temperature Hemodialysis System," Transactions American Society for Artificial Internal Organs, vol. VIII, Apr. 14, 1962, pp. 209–211, 215–217.

Kiil et al., "Parallelflow Plastic Hemodialyser," Trans. Amer. Soc. Art. Int. Organs, 1962, pp. 43–46.

Sachs et al., "Stretching of the Dialysis Membrane," Trans. Amer. Soc. Artif. Int. Organs, vol. IX, Apr. 16, 1963, pp. 79, 80, 82–84.

REUBEN FRIEDMAN, Primary Examiner

C. M. DITLOW, Assistant Examiner